(12) United States Patent
Hay et al.

(10) Patent No.: US 11,188,645 B2
(45) Date of Patent: *Nov. 30, 2021

(54) IDENTIFYING WHETHER AN APPLICATION IS MALICIOUS

(71) Applicant: International Business Machines Corporation, Armonk, NY (US)

(72) Inventors: Roee Hay, Singapore (SG); Daniel Kalman, Tel-Aviv (IL); Roi Saltzman, Rishon Le Zion (IL); Omer Tripp, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,846

(22) Filed: Nov. 27, 2019

(65) Prior Publication Data

US 2020/0097654 A1 Mar. 26, 2020

Related U.S. Application Data

(63) Continuation of application No. 16/199,250, filed on Nov. 26, 2018, now Pat. No. 10,599,843, which is a
(Continued)

(51) Int. Cl.
*G06F 21/56* (2013.01)
*G06F 21/51* (2013.01)

(52) U.S. Cl.
CPC .............. *G06F 21/56* (2013.01); *G06F 21/51* (2013.01); *G06F 21/561* (2013.01); *G06F 21/562* (2013.01); *G06F 21/566* (2013.01)

(58) Field of Classification Search
CPC ...... G06F 21/554; G06F 21/56; G06F 21/562; G06F 2221/2149; G06F 8/61; H04L 63/1416; H04L 63/145
See application file for complete search history.

(56) References Cited

U.S. PATENT DOCUMENTS 8,122,251 B2 2/2012 Santos et al.
8,595,841 B2 11/2013 Britton et al.
(Continued)

FOREIGN PATENT DOCUMENTS

EP 2348442 A1 7/2011
JP 2010262609 A2 11/2010
(Continued)

OTHER PUBLICATIONS

Enck, W., "Defending Users Against Smart phone Apps:Techniques And Future Directions," [Online] In ICISS '11, Proc. of 7th Int'l. Conf. on Information Systems Security, pp. 49-70, Springer 2011, retrieved from the Internet: <http://www.enck.org/pubs/enck-iciss11.pdf>.

(Continued)

*Primary Examiner* — Mohammed Waliullah
(74) *Attorney, Agent, or Firm* — Cuenot, Forsythe & Kim, LLC

(57) ABSTRACT

A first application being presented for installation on a processing system can be detected. The first application can be scanned, via a static analysis, to determine whether a user interface layout of the first application is suspiciously similar to a user interface layout of a second application installed on the processing system. If the static analysis is indeterminate, a runtime analysis of the first application can determine whether the interface layout implemented by the first application is suspiciously similar to the user interface layout of the second application. If the user interface layout implemented by the first application is suspiciously similar to the user interface layout of the second application installed on the processing system, the first application can be identified as being unsafe.

17 Claims, 4 Drawing Sheets

Related U.S. Application Data continuation of application No. 14/487,405, filed on Sep. 16, 2014, now Pat. No. 10,169,580, which is a continuation of application No. 13/971,270, filed on Aug. 20, 2013, now Pat. No. 8,990,940, which is a continuation of application No. 13/631,077, filed on Sep. 28, 2012, now Pat. No. 8,869,274.

(56) References Cited

U.S. PATENT DOCUMENTS

| | | | |
|---|---|---|---|
| 8,869,274 B2 | 10/2014 | Hay et al. | |
| 8,990,940 B2 | 3/2015 | Hay et al. | |
| 9,710,752 B2 | 7/2017 | Salajegheh et al. | |
| 9,781,151 B1 | 10/2017 | McCorkendale et al. | |
| 9,860,263 B2 | 1/2018 | Mahaffey et al. | |
| 10,169,580 B2 | 1/2019 | Hay et al. | |
| 2006/0123478 A1 | 6/2006 | Rehfuss et al. | |
| 2010/0186089 A1* | 7/2010 | Fu | G06F 21/53 726/23 |
| 2010/0333203 A1 | 12/2010 | Tsviatkou et al. | |
| 2011/0162078 A1 | 6/2011 | Taveau et al. | |
| 2011/0167474 A1 | 7/2011 | Sinha et al. | |
| 2012/0072991 A1 | 3/2012 | Belani et al. | |
| 2012/0110174 A1* | 5/2012 | Wootton | G06F 21/564 709/224 |
| 2012/0278892 A1* | 11/2012 | Turbin | G06F 8/67 726/24 |
| 2012/0291138 A1* | 11/2012 | Haga | G06F 21/51 726/27 |
| 2012/0317645 A1* | 12/2012 | Fortier | G06F 21/562 726/24 |
| 2014/0096240 A1 | 4/2014 | Hay et al. | |
| 2014/0096248 A1 | 4/2014 | Hay et al. | |
| 2015/0007322 A1 | 1/2015 | Hay et al. | |
| 2019/0095619 A1 | 3/2019 | Hay et al. | |

FOREIGN PATENT DOCUMENTS

| | | | |
|---|---|---|---|
| WO | 2012027588 A1 | 3/2012 | |
| WO | 2014049499 A1 | 4/2014 | |

OTHER PUBLICATIONS

Jeon, J. et al., "Dr. Android and Mr. Hide: fine-grained security policies on unmodified Android," [Online] Technical Report CS-TR-5006, Department of Computer Science, University of Maryland, Dec. 2011, retrieved from the Internet: <http://www.cs.umd.edu/~jfoster/papers/acplib.pdf>, 14 pgs.

"Robotium—It's Like Selenium, but for Android," [Online] Google Project Hosting, Google Inc., [retrieved Sep. 28, 12] retrieved from the Internet: <http://code.google.com/p/robotium/>, 2 pgs.

WIPO Appln. No. PCT/IB2013/058691, International Search Report and Written Opinion, dated Mar. 18, 2014, 6 pg.

Maeda, N., "Special Report 2: Mobile Phone and Smartphone Security, Your Mobile Phone is Being Targeted!" ASCII Technologies, Apr. 23, 2011, vol. 16, No. 6, pp. 74-79.

Medvet, E. et al., "Visual-similarity-based phishing detection," In Proc. of 4th Int'l. Conf. on Security and privacy in Communication Networks (SecureComm '08), ACM, 2008, 6 pg.

U.S. Appl. No. 13/971,270, Non-Final Office Action, dated Apr. 11, 2014, 33 pg.

U.S. Appl. No. 13/631,077, Non-Final Office Action, dated Oct. 22, 2013, 14 pg.

U.S. Appl. No. 13/631,077, Final Office Action, dated Mar. 18, 2014, 20 pg.

U.S. Appl. No. 13/631,077, Notice of Allowance, dated Jun. 4, 2014, 8 pg.

U.S. Appl. No. 13/971,270, Final Office Action, dated Sep. 8, 2014, 38 pg.

U.S. Appl. No. 13/971,270, Notice of Allowance, dated Nov. 14, 2014, 9 pg.

U.S. Appl. No. 14/487,405, Non-Final Office Action, dated Jul. 30, 2015, 41 pg.

U.S. Appl. No. 14/487,405, Corrected Non-Final Rejection, dated Aug. 13, 2015, 42 pg.

U.S. Appl. No. 14/487,405, Final Office Action, dated Dec. 31, 2015, 44 pg.

U.S. Appl. No. 14/487,405, Examiner's Answer, dated Oct. 6, 2016, 50 pg.

U.S. Appl. No. 14/487,405, Decision on Appeal, Oct. 13, 2017, 17 pg.

U.S. Appl. No. 14/487,405, Decision on Reconsideration, Jan. 26, 2018, 6 pg.

U.S. Appl. No. 14/487,405, filed Apr. 16, 2018, Non-Final Office Action, 15 pg.

U.S. Appl. No. 14/487,405, Notice of Allowance, dated Aug. 24, 2018, 7 pg.

U.S. Appl. No. 16/199,250, Notice of Allowance, dated Aug. 2, 2019, 8 pg.

U.S. Appl. No. 16/199,250, Notice of Allowance, dated Nov. 12, 2019, 7 pg.

Rosiello, A.P.E. et al.,"A Layout-Similarity-Based Approach for Detecting Phishing Page", SecureComm 2007, IEEE, Jul. 17, 2007, p. 1-10.

* cited by examiner

IDENTIFYING WHETHER AN APPLICATION IS MALICIOUS

BACKGROUND

The present invention relates to identifying whether an application is malicious.

Phishing attacks oftentimes are implemented by malicious parties masquerading as trustworthy entities in electronic communications. A typical way of initiating a phishing attack is to install a malicious application on a user's processing system. The malicious application may be communicated to the processing system via an instant message, e-mail, or via a malicious or infected website the user accesses. In illustration, a communication may be sent to the user, and such communication can purport to be from popular social web site, auction site, financial institution, online payment processor, IT administrator, or the like. Such communication may provide a hyperlink to a malicious URL, to which the communication directs the user, and the user may select believing that the URL is safe.

When requested to load the URL, the web browser may allow the malicious application to be installed on user's processing system (e.g., a mobile device), external to a web browser that handles the URL visit requests. It may do so by firing an implicit Intent identified by the URL. This allows the malicious application to respond to the URL request using a graphical interface (GUI) that is essentially identical to that of the browser. The transition between the real browser and the malicious application is smooth, and is thus likely to be missed by a benign user. For example, the malicious application can pretend to be the user's bank website. The user then may enter into the malicious application account details, such as a user name and password, which the malicious application can retain. Malicious users then may use such details to gain access to the user's account.

BRIEF SUMMARY

A method includes detecting a first application being presented for installation on a processing system. The method also can include scanning, via a static analysis implemented by a processor, the first application. The method also can include determining, by the static analysis, whether a user interface layout of the first application is suspiciously similar to a user interface layout of a second application installed on the processing system and determining, by the static analysis, possible user interface layouts of the first application, wherein the user interface layout of the first application being suspiciously similar to the user interface layout of the second application indicates the first application is attempting to emulate the second application. The method also can include, responsive to the static analysis being indeterminate as to whether the first application is suspiciously similar to the user interface layout of the second application, responsive to the first application being executed, performing a runtime analysis of the first application and, by the runtime analysis, determining whether the interface layout implemented by the first application is suspiciously similar to the user interface layout of the second application. The method also can include, responsive to the runtime analysis indicating that the user interface layout implemented by the first application is suspiciously similar to the user interface layout of the second application installed on the processing system, identifying the first application as being unsafe.

A processing system includes a hardware processor configured to initiate executable operations. The executable operations include detecting a first application being presented for installation on a processing system. The executable operations also can include scanning, via a static analysis, the first application. The executable operations also can include determining, by the static analysis, whether a user interface layout of the first application is suspiciously similar to a user interface layout of a second application installed on the processing system and determining, by the static analysis, possible user interface layouts of the first application, wherein the user interface layout of the first application being suspiciously similar to the user interface layout of the second application indicates the first application is attempting to emulate the second application. The executable operations also can include, responsive to the static analysis being indeterminate as to whether the first application is suspiciously similar to the user interface layout of the second application, responsive to the first application being executed, performing a runtime analysis of the first application and, by the runtime analysis, determining whether the interface layout implemented by the first application is suspiciously similar to the user interface layout of the second application. The executable operations also can include, responsive to the runtime analysis indicating that the user interface layout implemented by the first application is suspiciously similar to the user interface layout of the second application installed on the processing system, identifying the first application as being unsafe.

A computer program product system includes a computer-readable storage device, wherein the computer-readable storage device is not a transitory, propagating signal per se, having stored thereon program code that, when executed, configures a processor to perform operations. The operations include detecting a first application being presented for installation on a processing system. The operations also can include scanning, via a static analysis, the first application. The operations also can include determining, by the static analysis, whether a user interface layout of the first application is suspiciously similar to a user interface layout of a second application installed on the processing system and determining, by the static analysis, possible user interface layouts of the first application, wherein the user interface layout of the first application being suspiciously similar to the user interface layout of the second application indicates the first application is attempting to emulate the second application. The operations also can include, responsive to the static analysis being indeterminate as to whether the first application is suspiciously similar to the user interface layout of the second application, responsive to the first application being executed, performing a runtime analysis of the first application and, by the runtime analysis, determining whether the interface layout implemented by the first application is suspiciously similar to the user interface layout of the second application. The operations also can include, responsive to the runtime analysis indicating that the user interface layout implemented by the first application is suspiciously similar to the user interface layout of the second application installed on the processing system, identifying the first application as being unsafe.

DETAILED DESCRIPTION

Figure 1:
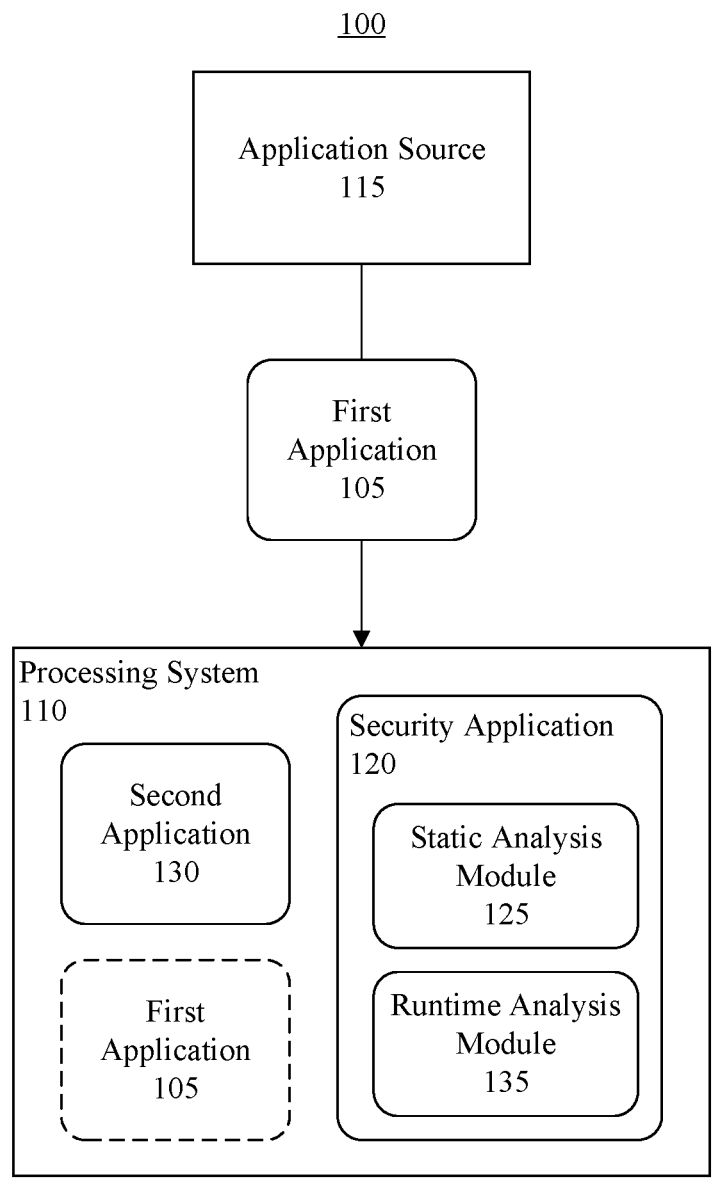
FIG. 1 is a block diagram illustrating a system in which an application is validated in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowcharts and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowcharts and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to validating an application to determine whether the application is a malicious application. When an application is installed onto a processing system (e.g., a mobile device) a static analysis can be performed on the application to determine whether the application is a phishing application configured to maliciously phish for private user information, such as user identifiers (IDs), passwords, etc. A phishing application may attempt to phish for private user information by registering access to one or more inter-process communications that are sensitive (e.g. contain private user information), for example inter-process communications pertaining to a uniform resource identifier (URI) (e.g., a uniform resource locator (URL)). A phishing application also may attempt emulate a web browser in order to capture private information and provide such information to a malicious entity.

If the static analysis determines that the application is a phishing application, the static analysis can generate an alert and/or disable operation of the application. If the static analysis is indeterminate as to whether the application is phishing application, further runtime analysis can be provided to determine such. If the runtime analysis determines that the application is a phishing application, the runtime analysis can generate an alert and/or disable operation of the application.

FIG. 1 is a block diagram illustrating a system 100 in which a first application 105 is validated in accordance with one embodiment disclosed within this specification.

The first application 105 may be presented to a processing system 110 from an application source 115 for installation onto the processing system 110. In one arrangement, the application source 115 may be an electronic communication (e.g., an instant message or electronic mail (e-mail)) provided to the processing system 110, for example to an electronic communication client executed on the processing system 110. The application source 115 can provide to the processing system 110 the first application 105. For example, upon opening the electronic communication, the electronic communication may attempt to initiate installation of the first application 105 on the processing system 110, or present to the user a control via which the application source 115 entices the user to select to initiate installation of the first application 105 on the processing system 110. Upon selection of the control by the user, an attempt to install the first application 105 on the processing system 110 can be initiated. In another arrangement, the application source 115 may be a malicious or infected website indicated in an electronic communication, for example via a hyperlink the user is enticed to select, that initiates installation of the first application 105 when the user accesses the website, or downloads content from the website. Still, there are numerous ways in which unscrupulous users may attempt to infect the processing system 110 with the first application 105 and the present arrangements are not limited in this regard.

When the first application 105 is presented to the processing system 110 for installation, either before installation, during installation or after installation of the first application 105, a security application 120 can be executed by the processing system 110 to initiate a static analysis module 125 to perform static analysis of the first application 105 in order to determine whether the first application 105 is malicious. In illustration, the security application 120 can determine whether the first application 105 contains malicious code, such as a root kit or the like, and either block installation of the first application 105, block installation of the root kit, or delete the installation of the first application 105 and/or root kit if such have already been installed on the processing system 110. The first application 105, however, may not contain a root kit, or the like, identifiable by the static analysis module 125, yet still may be malicious.

The static analysis module 125 can scan the first application 105 to determine whether the first application 105 contains a user interface (UI). If so, the static analysis module 125 can scan a layout of the first application's UI to determine whether the first application 105 is suspiciously similar to a UI layout of a second application 130 installed on the processing system, such as a web browser. In illustration, the static analysis module 125 can scan a declaration, manifest file or extensible markup language (XML) document of the first application 105 to determine the UI layout configuration of the first application 105, and scan a declaration, manifest file or XML document of the second application 130 to determine the UI layout configuration of the second application 130, and compare the results of such scans. If the UI layout of the first application 105 is suspiciously similar to the UI layout of the second application 130, this may indicate that the first application 105 is attempting to emulate the second application 130 in order to phish for private user data.

If the static analysis module 125 determines that the first application's UI layout is suspiciously similar to the UI layout of the second application 130 (e.g., there is a close resemblance between such properties), the security application 120 can register the first application 105 as potentially being unsafe. Further, the security application 120 can block installation of the first application 105 and/or generate an alert indicating that the first application 105 is a malicious application (or potentially is unsafe). The alert can be presented to the user, for example via a pop-up message or word balloon and/or communicated to the processing system 110.

In some instances the static analysis module 125 may not be able to completely validate the first application 105. In other words, the static analysis may be indeterminate as to whether the UI layout of the first application 105 is suspiciously similar to the UI layout of the second application 130. This may be due to instances where some or all of the UI components of the first application 105 are built dynamically based on data values available only at runtime and/or stored in a backend data storage (e.g., a database). In instances where there may be runtime UI layout(s) of the first application 105 for which the layout configuration is unknown when the first application 105 is installed, the static analysis module 125 can provide additional output data. For example, the static analysis module 125 can determine a number of possible UI runtime layouts of the first application 105, if such information is available, and indicate such as additional output data. If there potentially may be additional UI runtime layouts of the first application 105, but the total number of such additional UI runtime layouts is unknown, the additional output data can indicate such.

The static analysis module 125 also can, based on the scan of the first application 105, identify inter-process communications monitored, or subscribed to, by the first application 105. The static analysis module 125 can provide further output data indicating such inter-process communications.

The output data provided by the static analysis module 125 can be retrieved by the security application 120 and stored to a machine-readable storage, either temporarily or permanently. Such output data can be made available to a runtime analysis module 135 of the security application 120 or other components of the processing system 110.

If the static analysis module 125 is not able to completely validate the first application 105, the security application 120 can allow the processing system 110 to install and/or execute the first application 105. In this regard, the first application 105 can be scanned by the static analysis module 125 prior to, or after, installation onto the processing system 110. Indeed, in one aspect, if the static analysis module 125 determines that the first application 105 is malicious, the security application 120 can prevent the first application from installing onto the processing system 110, though the present arrangements are not limited in this regard.

Notwithstanding, the security application 120 can perform runtime analysis on the first application 105 when the first application 105 executes. For example the security application 120 can initiate the runtime analysis module 135 to determine whether the UI layout provided by the first application 105, during execution, is suspiciously similar to the UI layout of the second application 130. If the runtime analysis module 135 indicates that the user interface layout of the first application 105 is suspiciously similar to the user interface layout of the second application 130, the security application 120 can generate an alert indicating that the first application 105 is malicious, for example as previously described.

Further, output data provided by the static analysis module 125 can be processed by the runtime analysis module 135 to perform runtime scanning of the first application 105 when the first application 105 is installed onto, and executed by, the processing system 110. In illustration, at runtime, inter-process communications between the second application 130 and the first application 105 can be monitored by the runtime analysis module 135. Such inter-process communications can be identified based on the output data related to the static analysis performed on the first application 105 by the static analysis module 125.

When the first application 105 provides a runtime UI layout having a configuration unknown to static analysis module 125 at the time of the static analysis, and the first application 105 attempts, or requests, to respond to an invitation by the second application 130 to process a URI, the target URI can be loaded within the second application 130 and its UI layout properties can be recorded. In addition, the first application 105 also can be loaded, and thus its UI layout properties can be scanned. Based on the UI layout properties of the first application 105 and the second application 130 a determination can be made as to whether the first application 105 is malicious. In illustration, if the current UI layout of the first application 105 is suspiciously similar to the UI layout of the second application 130 (e.g., there is a close resemblance between the current UI layout properties of the second application 130 and the UI layout properties of the first application 105), the first application 105 can be identified as potentially being unsafe. Accordingly, an alert indicating that the first application 105 is malicious can be generated by the security application 120. Further, the security application 120 can prevent the first application 105 from storing or communicating information received from user inputs received by the processing system 110. If the current UI layout of the first application 105 is not suspiciously similar to the UI layout of the second application 130, however, the processing system can register the current UI layout of the first application 105 as being benign from a phishing perspective, though the application need not be fully certified as being safe.

Here, the additional information about other UI layouts supported by the first application 105 (if available) is relevant. If the first application 105 provides a known number of possible UI layouts at runtime, at runtime the first application 105 can scan each of the application UI layouts of the first application 105 to compare such UI layouts to the UI layout of the second application 130, in real time, as they are implemented by the first application 105. For example, the runtime analysis module 135 can determine that a current UI layout provided by the first application 105 is not suspiciously similar to a UI layout provided by the second application 130. However, the first application 105 may provide a next UI layout, for example in response to detecting an inter-process communication, and in response to such inter-process communication the runtime analysis module 135 can compare the next UI layout of the first application 105 to the UI layout provided by the second application 130. If these UI layouts are suspiciously similar, the security application 120 can generate an alert.

The processing system can track the total number of different UI layouts of the first application 105 as compared to the UI layout of the second application 130 as such comparisons take place. If none of the first application 105 UI layouts are suspiciously similar (e.g., closely resemble) the second application 130 UI layout, when the number of first application 105 UI layouts scanned equals the known total number of first application 105 UI layouts, the first application 105 can be certified as being safe. Otherwise, the current session can resume normally, but the first application 105 is not certified as being safe in general since there may be additional UI layouts of the first application 105 that have not been compared to the web browser.

Further, either the static analysis module 125 and/or the runtime analysis module 135 can be configured to determine whether the first application 105 is configured to attempt to, or request, access at least one inter-process communication that contains private information. When the first application 105 is configured to attempt to, or request, access the at least one inter-process communication that contains private information, the security application 120 can determine that the first application 105 is malicious, and generate a corresponding alert.

The comparison of the UI layout of the first application 105 to the second application 130 can be performed in any suitable manner, including use of custom code/tools and/or use of tools known in the art. In illustration, the Robotium test framework for Android™ can be used to compare UI layout properties of the first and second applications 105, 130 in the case that the processing system 110 uses the Android™ operating system.

Inter-process communications can comprise, for example in the Android™ operating system, passing of intent objects. As used herein, the term "Intent object" means a passive data structure holding an abstract description of an operation to be performed or a description of an event that has happened and is being announced. Intent objects provide a means of communicating among different applications executing in an operating system environment. In one aspect, an intent object can be an implicit intent object. An implicit intent object is an intent object that does not name a target component that should act upon the intent object. In another aspect, the intent object can be an explicit intent object. An explicit intent object is an intent object that specifically names a target component that should act upon the intent object. In the iOS® operating system, the inter-process communications can include messages exchanged by applications invoking other applications' URI protocols. Such messages may include message content.

As used herein, the term "suspiciously similar" means a level of similarity between at least two UI layouts that is exact, or a level of similarity such that the user does not recognize that the UI layouts are different without more than a mere glance of the respective UI layouts. In illustration, when a UI layout of the first application 105 is suspiciously similar to a UI layout of the second application 130, without a direct comparison of the UI layouts, or the attention of the user being drawn to identify whether they are different, the user may not recognize that the UI layout of the first application 105 does not directly correspond to the UI layout of the second application 130, even though the user may have previously viewed the UI layout of the second application 130. In other words, the UI layout of the first application 105 may be confusingly similar to the UI layout of the second application 130.

As used herein, the term "real time" means a level of processing responsiveness that a user or system senses as sufficiently immediate for a particular process or determination to be made, or that enables the processor to keep up with some external process.

Figure 2:
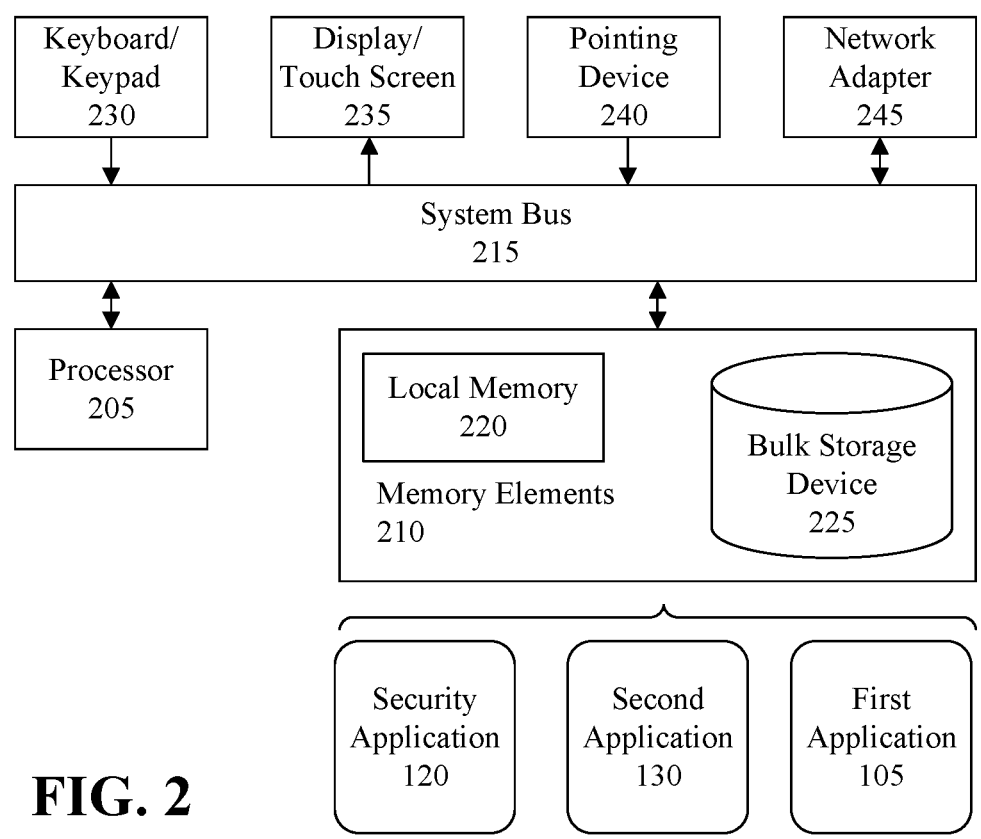
FIG. 2 is a block diagram illustrating a processing system that performs validation an application in accordance with one embodiment disclosed within this specification.

FIG. 2 is a block diagram illustrating an exemplary implementation of a processing system 110 of FIG. 1 in accordance with an embodiment disclosed within this specification. The processing system 110 is configured to identify a malicious application. The processing system 110 can be a computer, a mobile computer, a laptop computer, a tablet computer, a smart phone, a personal digital assistant, a gaming device, an appliance, or any other processing system configured to execute applications.

The processing system 110 can include at least one processor 205 coupled to memory elements 210 through a system bus 215 or other suitable circuitry. As such, the processing system 110 can store program code within the memory elements 210. The processor 205 can execute the program code accessed from the memory elements 210 via the system bus 215. It should be appreciated that the processing system 110 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 110 also can include one or more cache memories (not shown) that provide temporary storage of at least some program code in order to reduce the number of times program code must be retrieved from the bulk storage device 225 during execution.

Input/output (I/O) devices such as a keyboard and/or keypad 230, a display and/or touch screen 235 and/or a pointing device 240. The I/O devices can be coupled to the processing system 110 either directly or through intervening I/O controllers. For example, the display/touchscreen 235 can be coupled to the processing system 110 via a graphics processing unit (GPU), which may be a component of the processor 205 or a discrete device. One or more network adapters 245 also can be coupled to processing system 110 to enable processing system 110 to become coupled to other systems, computer systems, remote printers, and/or remote storage devices through intervening private or public networks. Modems, cable modems, and Ethernet cards are examples of different types of network adapters 245 that can be used with processing system 110.

As pictured in FIG. 2, the memory elements 210 can store the components of the processing system 110, namely the security application 120, the second application 130 and the first application 105. Being implemented in the form of executable program code, the security application 120 and the second application 130 can be executed by processing system 110 (e.g., via the processor 205) and, as such, can be considered part of processing system 110. The first application 105 can be processed by the processing system 110, but need not be considered as part of the processing system 110 until installed. In illustration, the first application 105 can be stored, temporarily, in the memory elements 210 while being processed by the processor 205, but need not be installed in the operating system of the processing system 110, though, as noted, it can be.

The security application 120 can be executed by the processing system 110 (e.g., via the processor 205) to implement the operations and functions described herein as being performed by the security application 120, including the static analysis module 125 and the runtime analysis module 135. Further, the second application 130 can be a web browser, though this need not be the case.

Figure 3:
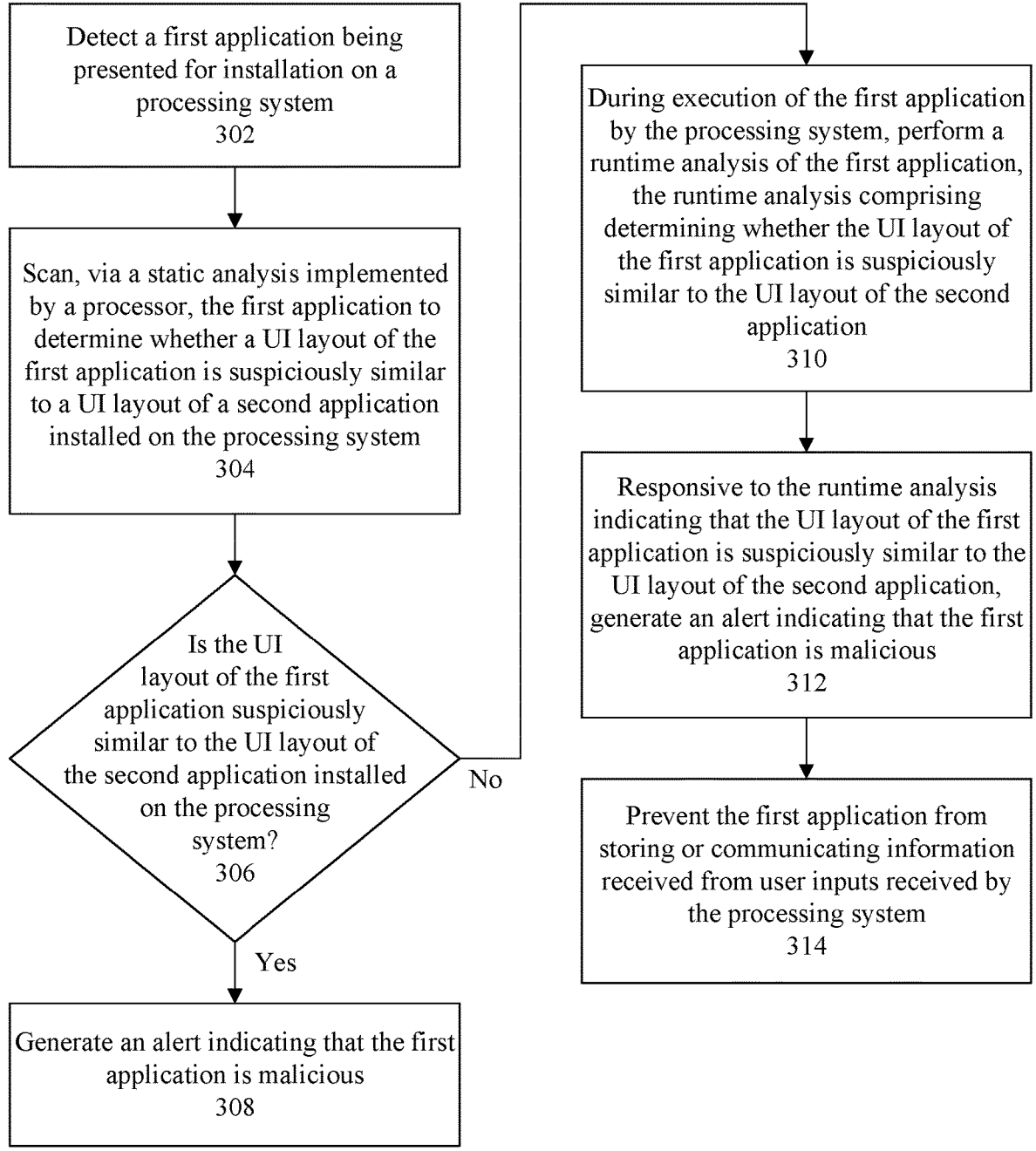
FIG. 3 is a flowchart illustrating a method of identifying whether a first application is malicious in accordance with another embodiment disclosed within this specification.

FIG. 3 is a flowchart illustrating a method 300 of identifying whether a first application is malicious in accordance with another embodiment disclosed within this specification. At step 302, a first application being presented for installation on a processing system can be detected. The first application can be received from a web site visited by a user, received in an electronic communication, or received from a website indicated in an electronic communication, for example via a URI (e.g., a URL).

At step 304, via a static analysis implemented via a processor, the first application can be scanned to determine whether a UI layout of the first application is suspiciously similar to a UI layout of a second application installed on the processing system. The static analysis can be performed prior to, or without, the first application being installed on the processing system, or when/after the first application is installed on the processing system.

At decision block 306, a determination can be made as to whether the UI layout of the first application is suspiciously similar to the UI layout of the second application installed on the processing system. If so, at step 308 an alert can be generated indicating that the first application is malicious.

In the UI layout of the first application is not suspiciously similar to the UI layout of the second application, at step 310, during execution of the first application by the processing system, a runtime analysis of the first application can be performed. The runtime analysis can comprise determining whether the UI layout of the first application is suspiciously similar to the UI layout of the second application. At step 312, responsive to the runtime analysis indicating that the UI layout of the first application is suspiciously similar to the UI layout of the second application, an alert can be generated indicating that the first application is malicious. At step 314, the first application can be prevented from storing or communicating information received from user inputs received by the processing system.

In one arrangement, performing the runtime analysis can include determining whether the first application at runtime attempts to, or requests, access at least one inter-process communication that contains private information. When the first application at runtime attempts, or requests, to access the at least one inter-process communication that contains private information, a determination can be made that the first application is malicious.

Performing the runtime analysis also can include determining, at runtime of the first application, whether a current UI layout of the first application is suspiciously similar to the UI layout of the second application. When the current UI layout of the application is not suspiciously similar to the UI layout of the second application, at runtime of the first application, a determination can be made as to whether a next UI layout of the first application is suspiciously similar to the UI layout of the second application.

In illustration, scanning, via the static analysis implemented by the processor, the first application to determine whether the UI layout of the first application is suspiciously similar to the UI layout of a second application installed on the processing system can include determining a total number of possible UI layouts of the first application. In such arrangement, the method 300 further can include, responsive to the static analysis being indeterminate as to whether the first application is suspiciously similar to the UI layout of the second application, when the first application is executed, performing a runtime analysis of the first application to identify each UI layout implemented by the first application, and determining whether each UI layout implemented by the first application is suspiciously similar to a UI layout of the second application. The method 300 also can include, responsive to the runtime analysis indicating that a total number of the first application UI layouts detected by the runtime analysis equals the total number of possible UI layouts determined by the static analysis, and that each of the first application UI layouts is not suspiciously similar to the UI layout of the second application installed on the processing system, identifying the application as being safe.

Figure 4:
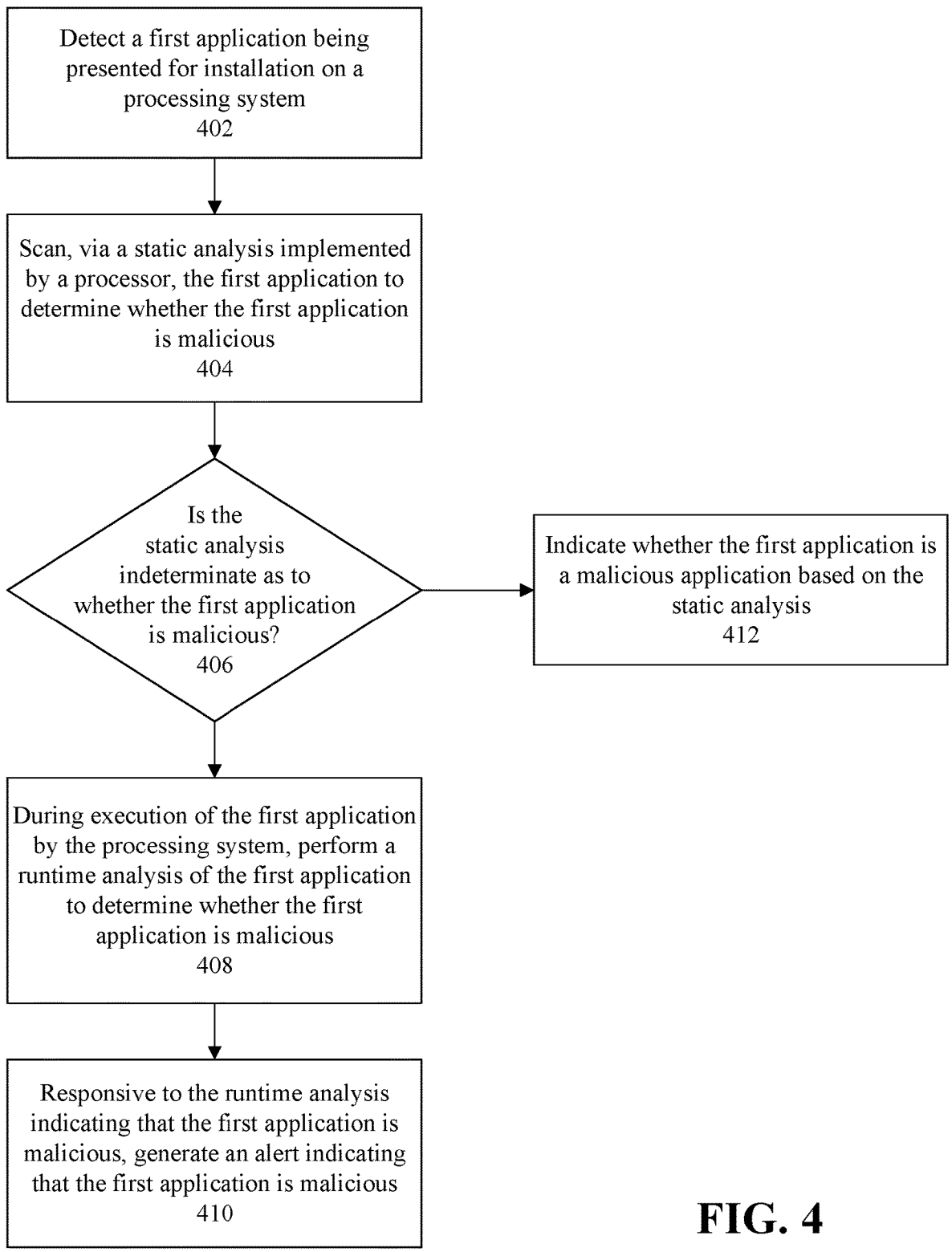
FIG. 4 is another flowchart illustrating a method of identifying whether a first application is malicious in accordance with another embodiment disclosed within this specification.

FIG. 4 is another flowchart illustrating a method 400 of identifying whether a first application is malicious in accordance with another embodiment disclosed within this specification. At step 402, a first application being presented for installation on a processing system can be detected. The first application can be received from a web site visited by a user, received in an electronic communication, or received from a website indicated in an electronic communication, for example via a URI.

At step 404, via a static analysis implemented by a processor, the first application can be scanned to determine whether the first application is malicious. At decision block 406, a determination can be made as to whether the static analysis is indeterminate as to whether the first application is malicious. If so, at step 408, during execution of the first application by the processing system, a runtime analysis of the first application can be performed to determine whether the first application is malicious. At step 410, responsive to the runtime analysis indicating that the first application is malicious, an alert indicating that the first application is malicious can be generated. Referring again to decision block 406, if the determination indicates that the static analysis is not indeterminate as to whether the first application is malicious, at step 412 whether the first application is a malicious can be indicated application based on the static analysis.

In one arrangement, performing the runtime analysis can include determining whether the first application at runtime attempts to, or requests, access at least one inter-process communication that contains private information. When the first application at runtime attempts, or requests, to access the at least one inter-process communication that contains private information, a determination can be made that the first application is malicious. In another arrangement, performing the runtime analysis can include determining, at runtime of the first application, whether a current UI layout of the first application is suspiciously similar to a UI layout of the second application. When the current UI layout of the first application is suspiciously similar to the UI layout of the second application, a determination can be made that the first application is malicious Like numbers have been used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method comprising:
   performing a runtime analysis of a first application and, by the runtime analysis, determining whether at least one user interface layout implemented by the first application is suspiciously similar to at least one user interface layout of a second application installed on a processing system by comparing a plurality of the user interface layouts implemented by the first application to a plurality of user interface layouts of the second application as the first application presents the user interface layouts; and
   responsive to the runtime analysis indicating that the at least one user interface layout implemented by the first application is suspiciously similar to the at least one user interface layout of the second application installed on the processing system, identifying the first application as being unsafe.

2. The method of claim 1, wherein the first application provides a known number of possible user interface layouts.

3. The method of claim 1, wherein at runtime the first application provides a known number of possible user interface layouts.

4. The method of claim 1, wherein:
   the runtime analysis further determines whether the first application is configured to attempt to, or request, access at least one inter-process communication that contains private information; and
   identifying the first application as being unsafe further is responsive to determining that the first application is configured to attempt to, or request, access the at least one inter-process communication that contains private information.

5. The method of claim 4, wherein the at least one inter-process communication comprises passing of an intent object.

6. The method of claim 1, wherein the runtime analysis indicates that each of the first application user interface layouts is suspiciously similar to the at least one user interface layout of the second application installed on the processing system.

7. A processing system comprising:
   a hardware processor configured to initiate executable operations comprising:
   performing a runtime analysis of a first application and, by the runtime analysis, determining whether at least one user interface layout implemented by the first application is suspiciously similar to at least one user interface layout implemented by a second application installed on the processing system by comparing a plurality of the user interface layouts implemented by the first application to a plurality of user interface layouts of the second application as the first application presents the user interface layouts; and
   responsive to the runtime analysis indicating that the at least one user interface layout implemented by the first application is suspiciously similar to the at least one user interface layout of the second application installed on the processing system, identifying the first application as being unsafe.

8. The processing system of claim 7, wherein the first application provides a known number of possible user interface layouts.

9. The processing system of claim 7, wherein at runtime the first application provides a known number of possible user interface layouts.

10. The processing system of claim 7, wherein:
    the runtime analysis further determines whether the first application is configured to attempt to, or request, access at least one inter-process communication that contains private information; and
    identifying the first application as being unsafe further is responsive to determining that the first application is configured to attempt to, or request, access the at least one inter-process communication that contains private information.

11. The processing system of claim 10, wherein the at least one inter-process communication comprises passing of an intent object.

12. The processing system of claim 7, wherein the runtime analysis indicates that each of the first application user interface layouts is suspiciously similar to the at least one user interface layout of the second application installed on the processing system.

13. A computer program product comprising: a computer-readable storage device, wherein the computer-readable storage device is not a transitory, propagating signal per se, having stored thereon program code that, when executed, configures a processor to perform operations comprising:
    performing a runtime analysis of a first application and, by the runtime analysis, determining whether at least one user interface layout implemented by the first application is suspiciously similar to at least one user interface layout of a second application installed on a processing system by comparing a plurality of the user interface layouts implemented by the first application to a plurality of user interface layouts of the second application as the first application presents the user interface layouts; and
    responsive to the runtime analysis indicating that the at least one user interface layout implemented by the first application is suspiciously similar to the at least one user interface layout of the second application installed on the processing system, identifying the first application as being unsafe.

14. The computer program product of claim 13, wherein the first application provides a known number of possible user interface layouts.

15. The computer program product of claim 14, wherein at runtime the first application provides a known number of possible user interface layouts.

16. The computer program product of claim 13, wherein:
    the runtime analysis further determines whether the first application is configured to attempt to, or request, access at least one inter-process communication that contains private information; and
    identifying the first application as being unsafe further is responsive to determining that the first application is configured to attempt to, or request, access the at least one inter-process communication that contains private information.

17. The computer program product of claim 16, wherein the at least one inter-process communication comprises passing of an intent object.

\* \* \* \* \*